United States Patent
Binetti et al.

(10) Patent No.: US 7,469,103 B2
(45) Date of Patent: Dec. 23, 2008

(54) ADD/DROP MULTIPLEXER FOR OTN/DWDM RINGS UTILIZING A PAIR OF MUXPONDERS

(75) Inventors: Stefano Binetti, Monza (IT); Luca Della Chiesa, Concorezzo (IT)

(73) Assignee: Cisco Technology, Inc., San Jose, CA (US)

( * ) Notice: Subject to any disclaimer, the term of this patent is extended or adjusted under 35 U.S.C. 154(b) by 536 days.

(21) Appl. No.: 11/101,787

(22) Filed: Apr. 8, 2005

(65) Prior Publication Data

US 2006/0228115 A1   Oct. 12, 2006

(51) Int. Cl.
*H04J 14/00* (2006.01)
*H04J 14/02* (2006.01)
(52) U.S. Cl. .......................................... 398/83; 398/67
(58) Field of Classification Search .................. 398/67, 398/68, 74, 83, 89, 176
See application file for complete search history.

(56) References Cited

U.S. PATENT DOCUMENTS

| | | | |
|---|---|---|---|
| 6,141,126 A | 10/2000 | Lahat et al. | |
| 6,456,409 B2 | 9/2002 | Zhou et al. | |
| 6,525,852 B1* | 2/2003 | Egnell | 398/83 |
| 6,665,495 B1 | 12/2003 | Miles et al. | |
| 6,810,215 B1* | 10/2004 | Oikawa | 398/175 |
| 6,868,205 B2 | 3/2005 | Weverka et al. | |
| 6,870,860 B1 | 3/2005 | Meagher et al. | |
| 7,164,860 B1* | 1/2007 | Narvaez et al. | 398/58 |
| 2004/0052528 A1* | 3/2004 | Halgren et al. | 398/75 |
| 2005/0129403 A1* | 6/2005 | Koopferstock | 398/83 |

* cited by examiner

*Primary Examiner*—Dalzid Singh
(74) *Attorney, Agent, or Firm*—Aka Chan LLP (57) ABSTRACT

Techniques for providing ADM functionality to an optical (OTN/DWDM) ring are provided. A pair of muxponder components are utilized to form a transparent ADM. In one muxponder, transmit signals are sent in a first direction and receive signals are received from a second direction. In the other muxponder, transmit signals are sent in the second direction and received from the first direction.

10 Claims, 8 Drawing Sheets

ADD/DROP MULTIPLEXER FOR OTN/DWDM RINGS UTILIZING A PAIR OF MUXPONDERS

BACKGROUND OF THE INVENTION

The present invention relates to DWDM networks. More specifically, the invention relates to techniques for providing Add/Drop Multiplexers (ADMs) utilizing a pair of muxponders.

There is a growing demand for services and bandwidth in networking. Since the 1980s, Synchronous Optical Network/Synchronous Digital Hierarchy (SONET/SDH) has provided protection, management and support for a transparent mix of traffic protocols over optical networks.

The subsequent deployment of Dense Wavelength Division Multiplex (DWDM) networks increased the existing fiber bandwidth, but the protection and management capabilities of SONET/SDH were lacking.

The Optical Transport Network (OTN) was developed to combine the protection and management capabilities of SONET/SDH with the bandwidth expandability of DWDM. ITU-T G.709 Network Node Interface for the Optical Transport Network, March 2003, define frames that include operation, administration, and maintenance capabilities as well as Forward Error Correction (FEC), which can be utilized to reduce transmission errors.

In a metro WDM/SONET network, there is a need to transport four OC-48 (Optical Channel) signals multiplexed into and OTN ring, with the OTU-2 (Optical Transport Unit) signal being converted into the wavelength of a WDM system. Currently, many components are utilized to perform this functionality.

For example, one could use one to four OC-48 linecards, a crossconnect, one or two OC-192 linecards, and a related transponder for G.709/WDM mapping. Although this solution may be satisfactory, the cost for the many components may be more than is necessary.

Accordingly, what is needed is an innovative way to provide transparent add/drop multiplexing of OC-48/STM-16 signals into an OTN/DWDM ring without unnecessary cost. Additionally, it would be beneficial to provide trunk and client side protection as well as add/drop capability in intermediate node.

SUMMARY OF THE INVENTION

The present invention provides innovative techniques for providing ADM functionality to an optical (e.g., DWDM) ring. In general, a pair of muxponder components are utilized to form a transparent OC-48 ADM. In one muxponder, transmit signals are sent in a first direction and receive signals are received from a second direction. In the other muxponder, transmit signals are sent in the second direction and received from the first direction.

Advantages include that a transparent ADM can be provided utilizing new or existing muxponders at a significantly reduced cost. Transparency is obtained leveraging the G.709 multiplexing of OC-48 signal into and OTU-2 frame. Client and trunk side protection can be provided. Additionally, flexibility as to the ports that are utilized can be easily achieved without unnecessary cost. Some specific embodiments of the invention are described below.

In one embodiment, the invention provides a method of providing add/drop multiplexing for an optical network utilizing a pair of muxponders. A first muxponder transmits signals in a first direction in the optical network. The first muxponder receives signals from a second direction in the optical network. A second muxponder transmits signals in the second direction in the optical network. The second muxponder receives signals from the first direction in the optical network. In some embodiments, the first and second muxponders aggregate OC-48/STM-16 signals to an OTU-2 G.709 ring, through ODU1 mapping and OTN asynchronous multiplexing of 4×ODU1 into the OTU2 frame.

In another embodiment, the invention provides a method of providing add/drop multiplexing for a SONET/SDH optical network utilizing a pair of OC-48/STM-16 muxponders. A first muxponder transmits OTU2 aggregated signals in a first direction to a first network device in the optical network. The first muxponder receives C-192 signals from a second direction from a second network device in the optical network. A second muxponder transmits OTU2 aggregated signals in the second direction to the second network device in the optical network. The second muxponder receives OTU2 aggregated signals from the first direction from the first network device in the optical network.

Other features and advantages of the invention will become readily apparent upon review of the following description in association with the accompanying drawings, where the same or similar structures are designated with the same reference numerals.

DETAILED DESCRIPTION OF EMBODIMENTS

In the description that follows, the present invention will be described in reference to embodiments that are used in association with muxponders for implementing an ADM for an optical network, such as a DWDM ring. However, embodiments of the invention are not limited to any particular version, protocol, environment, application, or implementation. For example, although embodiments of the invention will be described in reference to exemplary muxponders, the invention can advantageously utilize other muxponders and other configurations. Therefore, the description of the embodiments that follows is for purposes of illustration and not limitation.

Muxponder cards or devices that provide the capability to transport four OC-48 signals to a G.709 digitally wrapped OTU2 asynchronous multiplexed signal. Each of the OC-48 signal is mapped over one of the four available time slot in the OUT-2 frame. These point-to-point devices are known in the art and FIG. 1 shows a block diagram of a prior art muxponder card with these capabilities.

A muxponder card 1 receives OC-48 optical signals at one to four optical transceivers 3. As shown, the optical transceivers are Small Form Pluggable (SFP) devices. Optical transceivers 3 are connected to serial/deserializers 5, which are then connected to a multiplexer 7. Multiplexer performs a number of function, including G.709 digital wrapping, and will be described in more detail in reference to FIG. 2.

ES based Phase Lock Loop (PLL) clock recovery is provide by clock recovery 9. Lastly, muxponder card 1 includes DWDM optics 11 for a transmit signal and a receive signal.

Figure 1:
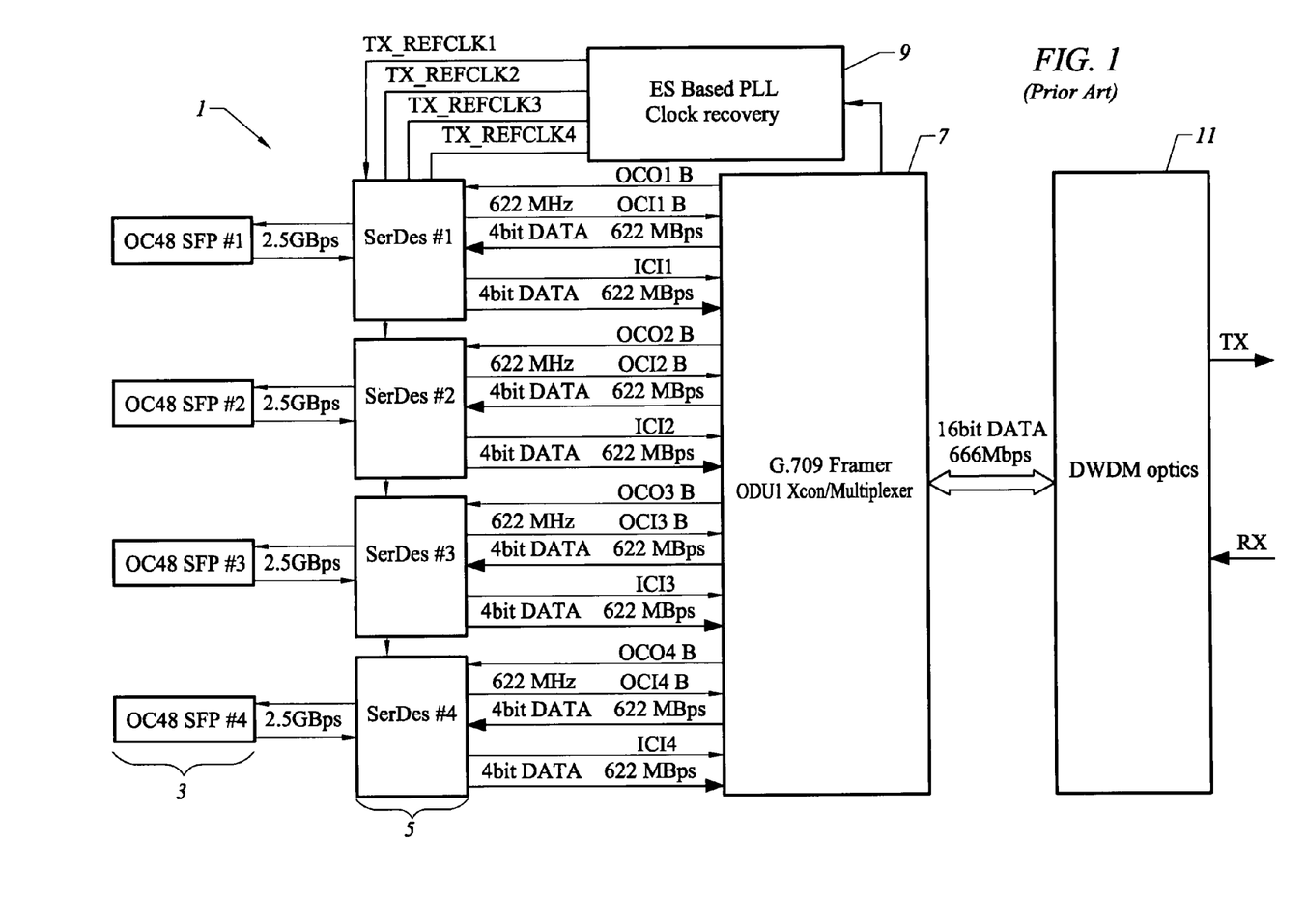
FIG. 1 shows a block diagram of a prior art muxponder card that can transport four OC-48 signals into an OTU2 aggregated signal based on G.709 asynchronous multiplexing.
Figure 2:
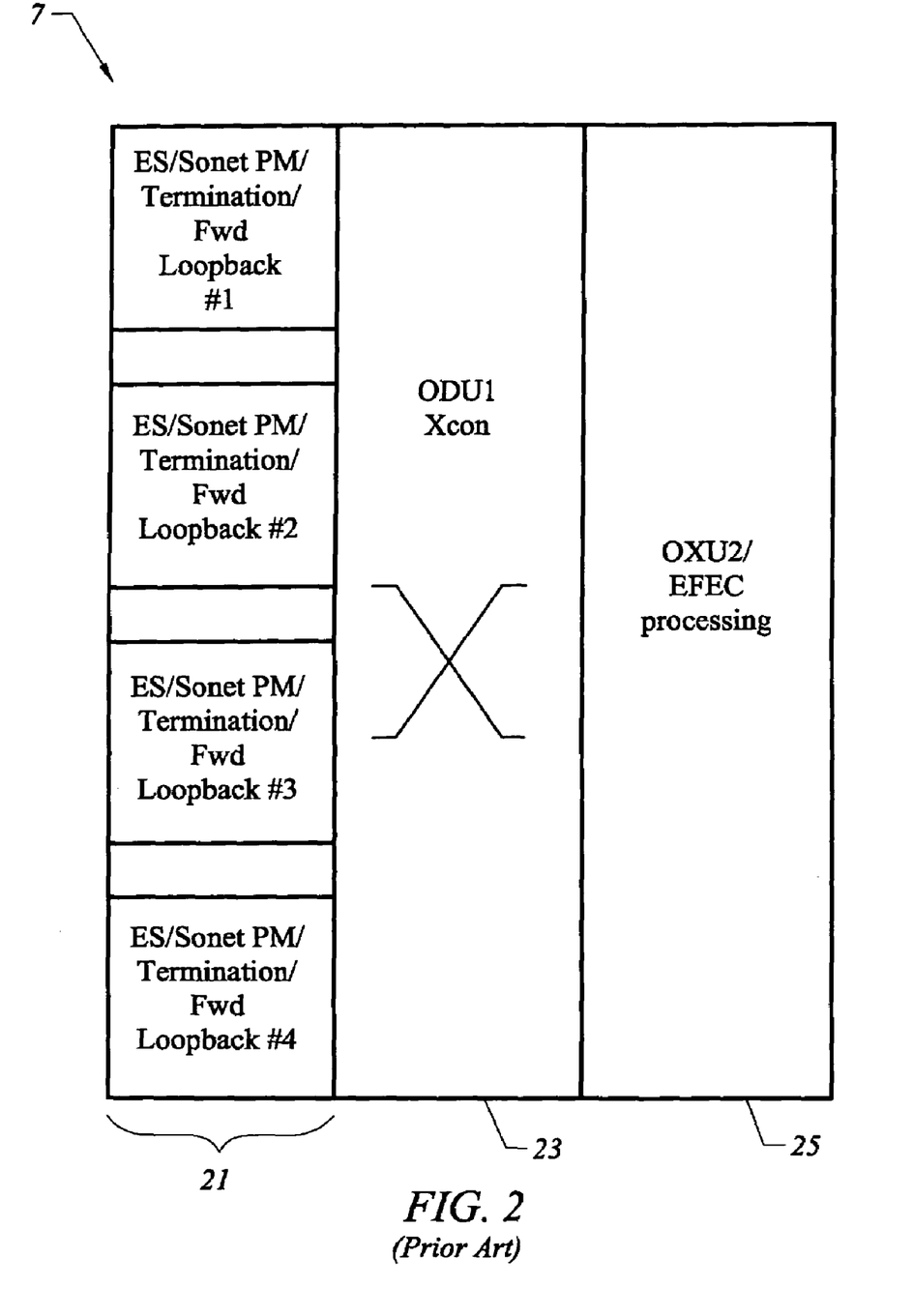
FIG. 2 shows more detail of the multiplexer of the muxponder card shown in FIG. 1.

Returning to multiplexer 7, FIG. 2 shows more detail of the multiplexer shown in FIG. 1. Each OC-48 signal is provided Elastic Store (ES), SONET performance monitoring, termination, and forward loopback at terminators 21. A crossconnect 23 provides a crossconnect for the OC-48/STM-16 signals. A framer 25 provides multiplexing of the OC-48 signals into ODU2 signals and G.709 framing including FEC processing.

FIGS. 1 and 2 are provided to show an example of muxponders that are available, such as the ONS 15454 Muxponder available from Cisco Systems, Inc. of San Jose, Calif. Although these muxponders are shown in the embodiments here, the invention can advantageously utilize other muxponders and configurations.

Figure 3:
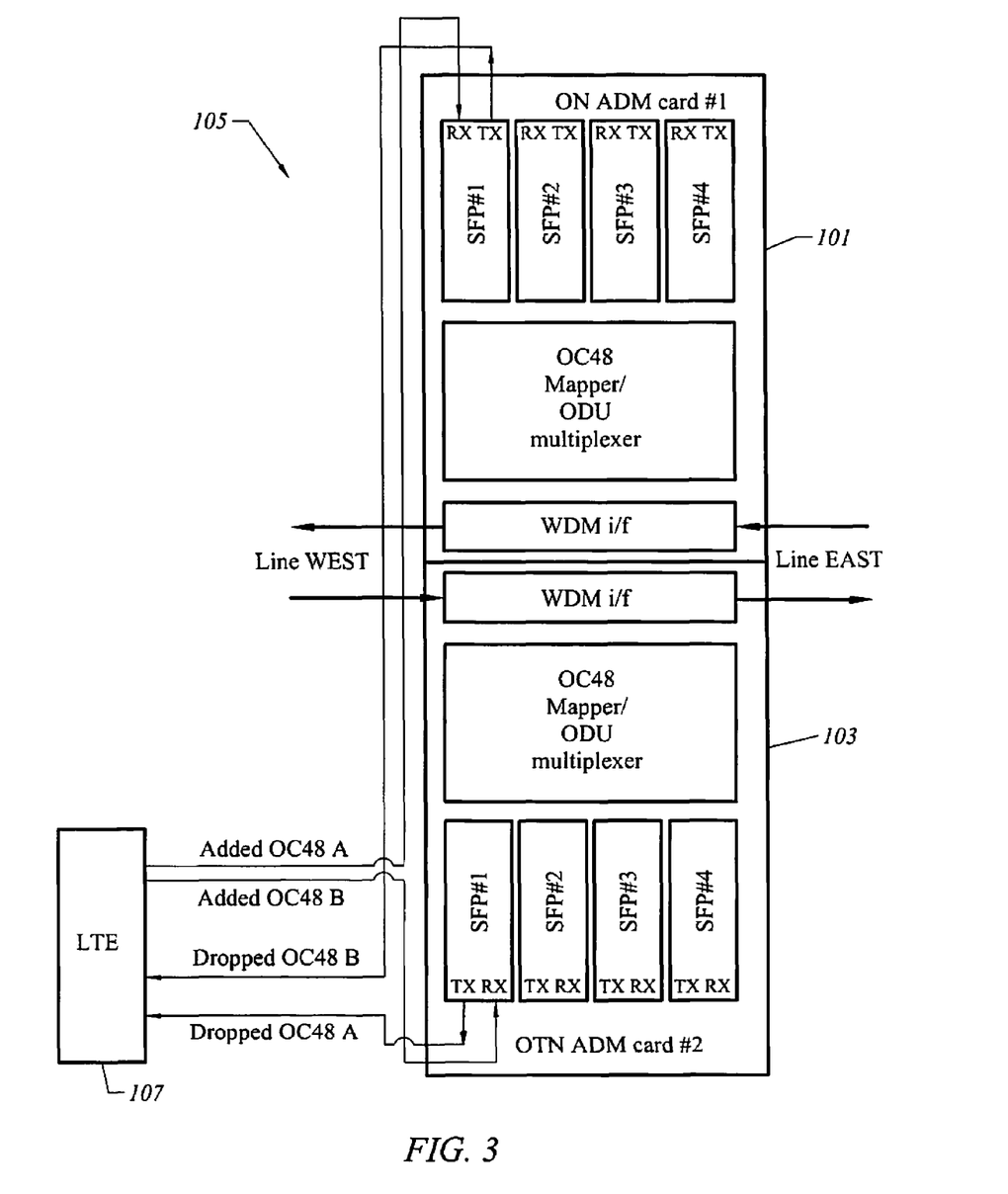
FIG. 3 shows an embodiment of the invention where two muxponders are utilized to implement an OC-48 ADM and provide 1+1 client protection.

FIG. 3 shows an embodiment of the invention where two muxponders are utilized to implement an OC-48 ADM and provide 1+1 client protection. A muxponder 101 is utilized with a muxponder 103 to implement an ADM 105.

Although muxponders are point-to-point devices, the pair of muxponders in FIG. 3 are configured in an innovative way. Muxponder 101 has the transmit signal going west (to a first network element that is not shown) and the receive signal coming from east (from a second network element that is not shown). Contrariwise, muxponder 103 has the transmit signal going east (to the second network element) and the receive signal coming from west (from the first network element). The east/west direction designations are arbitrary and only utilized to illustrate that the transmit and receive signals from one muxponder do not go directly to a single network element as is typical.

ADM 105 can be configured to provide 1+1 client protection as shown. Line Terminal Equipment (LTE) 107 adds an OC-48 signal A through muxponder 101 and an OC-48 signal B through muxponder 103. Additionally, OC-48 signal B is dropped from muxponder 101 and OC-48 signal A is dropped from muxponder 103. For example, OC-48 signal A could be the working signal and OC-48 signal B could be used for protection.

Figure 4:
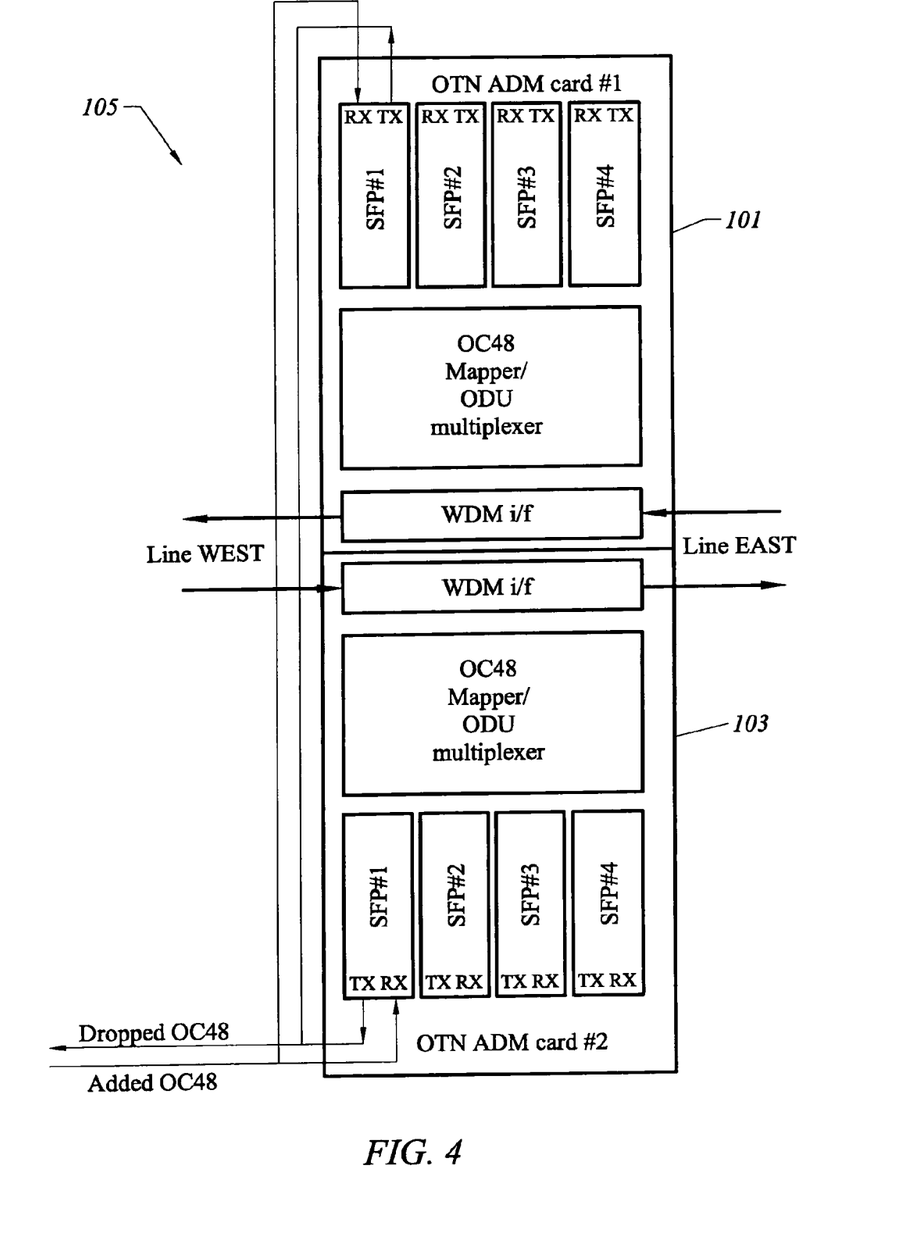
FIG. 4 shows an embodiment of the invention where two muxponders are utilized to implement an OC-48 ADM and provide Y-cable client protection.

FIG. 4 shows an embodiment of the invention where two muxponders are utilized to implement an OC-48 ADM and provide Y-cable client protection. ADM 105 is the same as shown in FIG. 3. Here, the configuration provides Y-cable client protection by adding an OC-48 signal to muxponders 101 and 103, while also dropping the OC-48 signal from muxponders 101 and 103. In this manner, if the lines in one direction are down, signals can be transmitted and received utilizing the other direction in the ring.

Although FIGS. 3 and 4 relate to client protection, trunk protection can be achieved using G.709 APS bytes/protocol.

Figure 5:
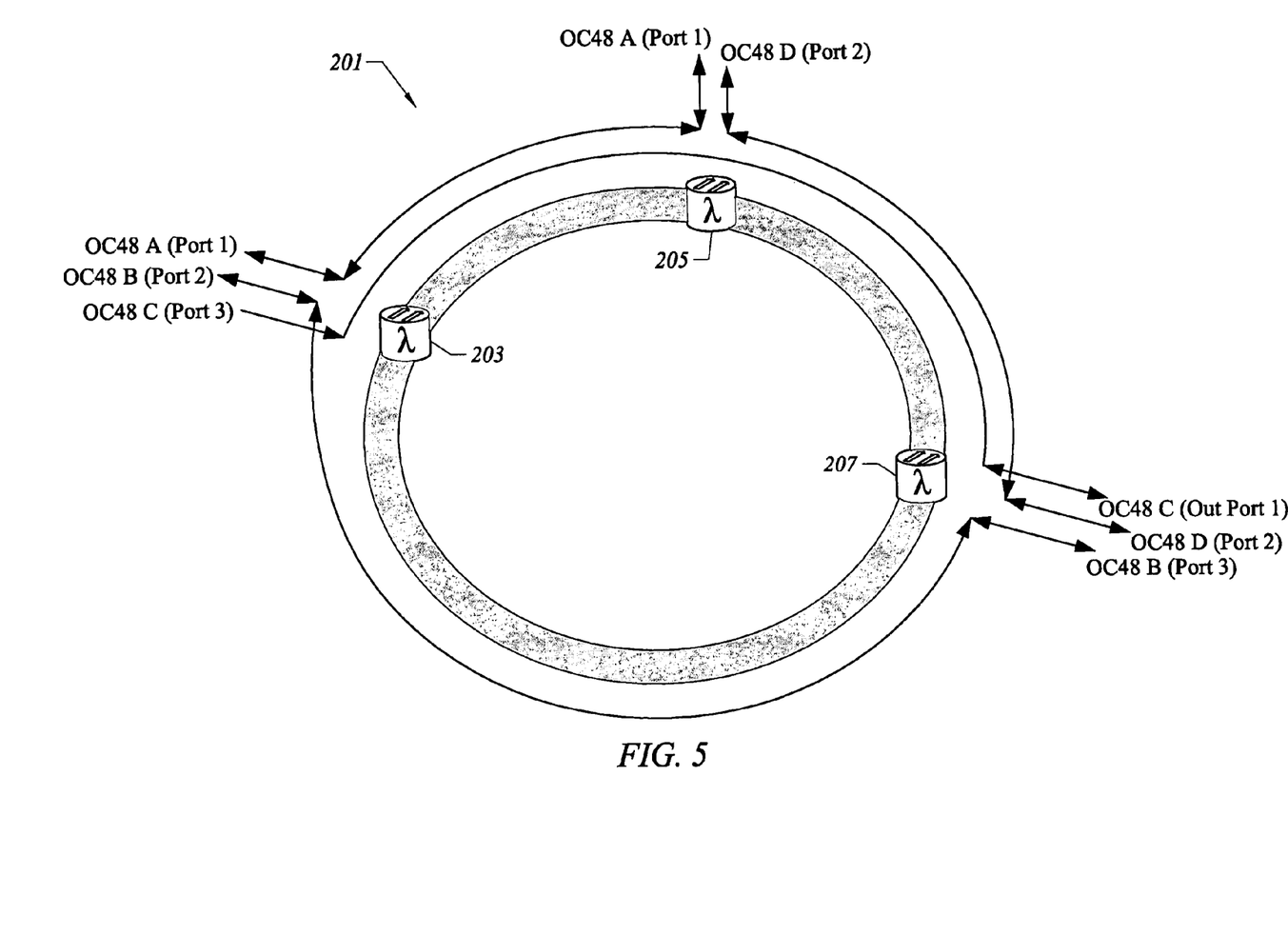
FIG. 5 illustrates a SONET ring that includes OC-48 ADMs according to the invention.

FIG. 5 illustrates a DWDM ring that includes OC-48 ADMs according to the invention. A DWDM ring 201 includes ADMs 203, 205 and 207. Although other network devices can be on the ring, the devices shown illustrate features of the invention.

As shown, OC-48 signal A is add/dropped at ADM 203 on port 1 and add/dropped at ADM 205 on port 1. Similarly, OC-48 signal D is add/dropped at ADM 205 on port 2 and add/dropped at ADM 207 on port 2. OC-48 signal B is add/dropped at ADM 203 on port 2 and add/dropped at ADM 207 on port 3.

OC-48 signal C is add/dropped at ADM 203 on port 3, passes through ADM 205 and is add/dropped at ADM 207 on port 1. If originally it was desired to have signal C add/dropped at ADM 207 on port 3, but the port was taken, embodiments of the invention allow the signal to be add/dropped on any available port.

Conventional solutions can provide similar flexibility but they are much more expensive as they typically include a crossconnects and many other components. Embodiments of the invention utilize a pair of muxponders and provide this flexibility at a significantly reduced cost.

The full transparency of the transported OC-48 channel is achieved with the capability of the muxponder to manage the OTN justification process and extract the original clock in the exit node. This, together with the OTN GCC bytes availability for remote communication purposes and all the others G.709 Operation, Administration and maintenance (OAM) capabilities, allows aggregation and transportation of the input signals without changing their clock domain nor using the DCC byes in a completely transparent manner. Access to OC-48 SOH can also be provided in a user configurable way for legacy support.

Figure 6:
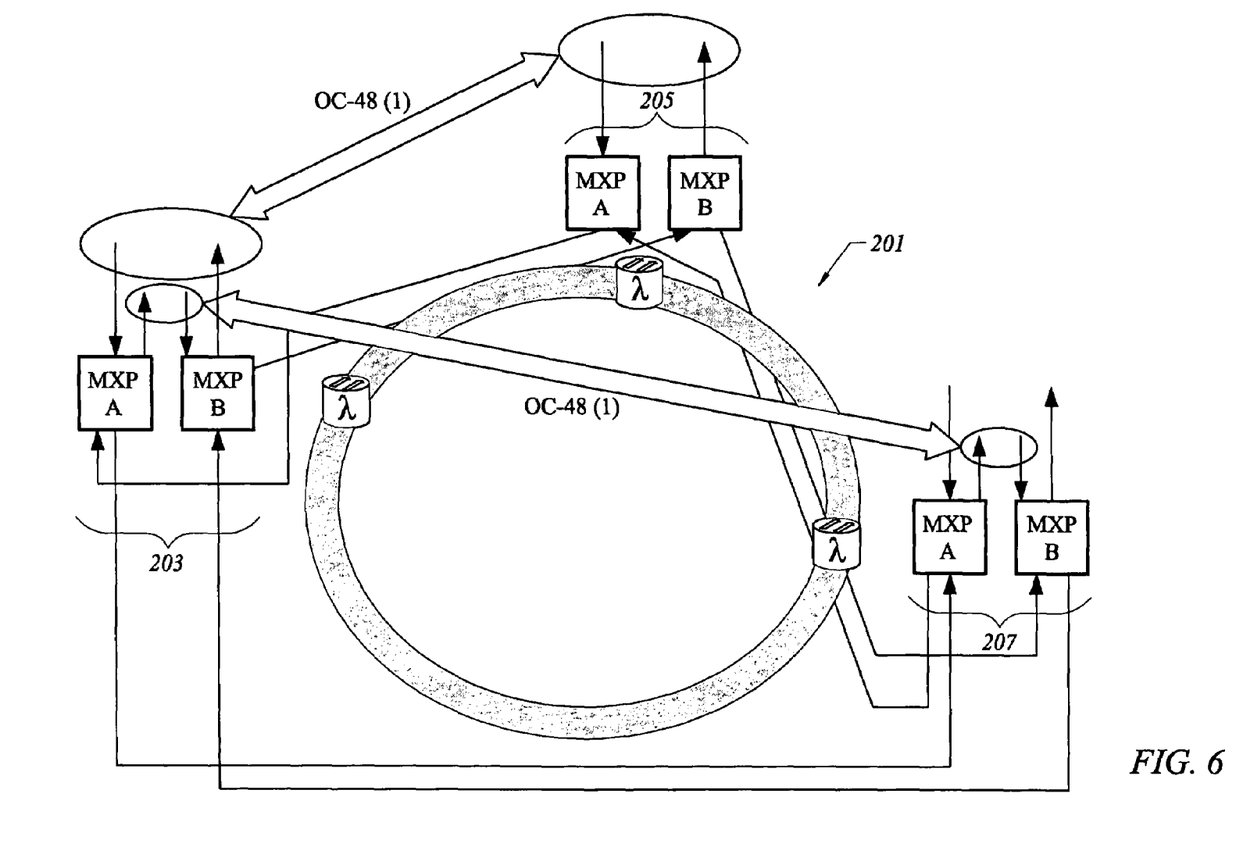
FIG. 6 shows signal paths for the muxponders that comprise the OC-48 ADMs shown in FIG. 5.

FIG. 6 shows signal paths for the muxponders that comprise the OC-48 ADMs shown in FIG. 5. Each of ADMs 203, 205 and 207 are shown as a pair of muxponders. With each pair, one muxponder transmits in a first direction and receives from a second direction, whereas the other muxponder transmits in the second direction and receives from the first direction.

Figure 7:
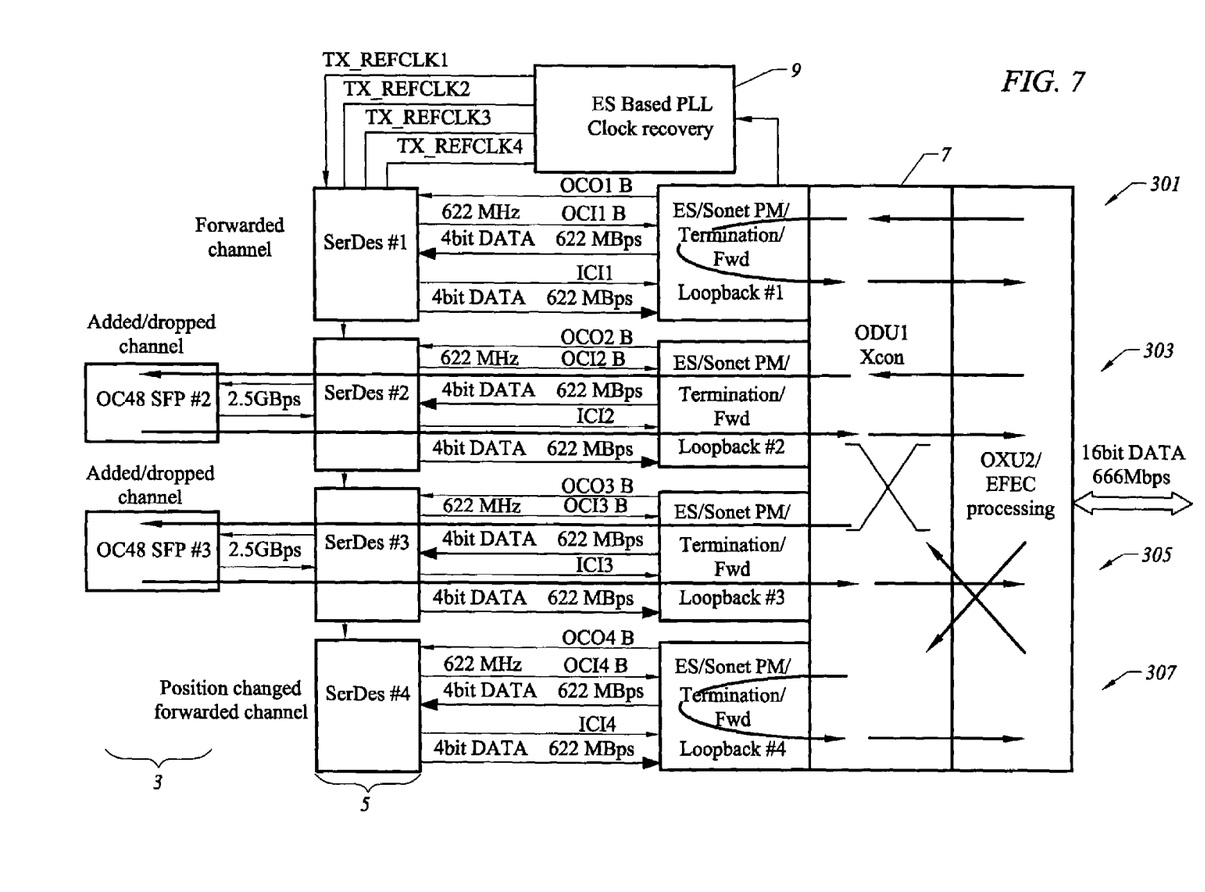
FIG. 7 illustrates a variety of signal paths that a muxponder in can be configured to perform in embodiments of the invention.

FIG. 7 illustrates a variety of signal paths that a muxponder in can be configured to perform. Only two SFPs are shown as these are all that are required to route the signals as shown so the other SFPs are not required to be installed.

Signal path 301 illustrates a forwarded channel. Signal path 303 illustrates an add/dropped channel. Similarly, signal paths 305 and 307 illustrate an add/dropped channel and a forwarded channel, but the position (or port) has been changed. Thus, by utilizing the existing crossconnect in the muxponder, flexibility in utilizing ports can be efficiently accomplished.

The above capabilities allow the OC-48 signal to be configured in one of the following ways:

1. Forward with regeneration and monitoring (channel does not need to be dropped)
2. Forward with regeneration and monitoring with a change of time slot inside the OUT-2 frame (channel does not need to be dropped)
3. Drop with monitoring on the same port of the time slot of the OUT-2 frame
4. Drop with monitoring on a different port of the time slot of the OUT-2 frame The above capabilities cover most of the standard SONET/SDH ADM multiplexers.

Figure 8:
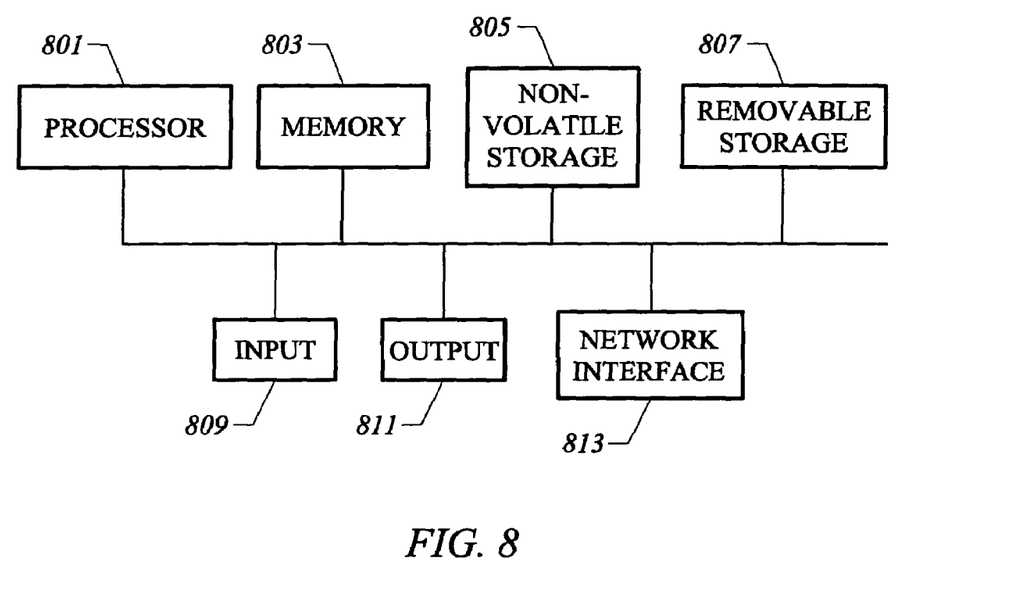
FIG. 8 illustrates a block diagram of a network device, computer system or subsystems thereof that can utilize embodiments of the invention.

Now that an exemplary embodiments have been described, FIG. 8 shows a block diagram of components that can be present in network devices and computer systems that incorporate embodiments of the invention. A processor 801 executes code (or instructions) that direct the operation of the processor. Although processors typically have memory caches, processor 801 utilizes memory 803, which can store code and data.

A non-volatile storage 805 can store code and data such that it is typically persistent and provides more storage when compared to memory 803. At present, a common non-volatile storage is one or more hard drives. A removable storage 807 provides mobility to code and/or data that are stored thereon. Examples of removable storage are floppy disks, tape, CD/ROM, flash memory devices, and the like.

Memory 803, non-volatile storage 805 and removable storage 807 provide examples of computer readable storage media that can be utilized to store and retrieve computer programs incorporating codes that implement the invention, data for use with the invention, and the like. Additionally, a data signal embodied in a carrier wave (e.g., in a network including the Internet) can be the computer readable storage medium. An input 809 allows a user to interface with the system. Input can be done through the use of a keyboard, a mouse, buttons, dials, or any other input mechanism. An output 811 allows the system to provide output to the user. Output can be provided through a monitor, display screen, LEDs, printer or any other output mechanism. Input and/or output can also be performed externally through a network interface 813.

Network interface 813 allows the system to interface with a network to which it is connected. The components shown in FIG. 8 can be found in many network devices and computer systems. However, components can be added, deleted and combined so FIG. 8 is for illustration purposes. Additionally, these components can also be present on subsystems (e.g., line cards) in network devices and computer systems.

While the above is a complete description of preferred embodiments of the invention, various alternatives, modifications, and equivalents can be used. It should be evident that the invention is equally applicable by making appropriate modifications to the embodiments described above. For example, although the invention has been described in relation to specific embodiments, the invention can be advantageously applied to other embodiments. Therefore, the above description should not be taken as limiting the scope of the invention as defined by the metes and bounds of the appended claims along with their full scope of equivalents

The invention claimed is:

1. For a pair of muxponders disposed such that a first muxponder receives first signals in a first direction from a first network device, transmits through signals in a second direction to a second network device, not transmitting drop signals in the first or second directions, and a second muxponder receives signals in the second direction from the second network device, transmits through signals in the first direction to the first network device, not transmitting drop signals in the first or second direction, a method of providing add/drop multiplexing for an optical network, comprising:

transmitting the drop signals from the first muxponder to one or more client devices attached to said first muxponder;

receiving add signals at the first muxponder from the one or more client devices attached to the first muxponder; and receiving add signals at the second muxponder from the one or more client devices attached to the second muxponder.

2. The method of claim 1, wherein the first and second muxponders aggregate OC-48/STM-16 signals to an OTU2-DWDM ring.

3. The method of claim 2, wherein the first and second muxponders perform transparent OC-48 aggregation over G.709 frames.

4. The method of claim 1, wherein the add signals received by the second muxponder comprise the add signals received by the first muxponder.

5. The method of claim 4 wherein the second muxponder transmits drop signals to the one or more client devices attached to the second muxponder, the client devices being identical to the client devices attached to the first muxponder.

6. For a pair of OC-48/STM-16 muxponders disposed such that a first muxponder receives first OTU2 signals in a first direction from a first network device, transmits through OTU2 signals in a second direction to a second network device, not transmitting drop signals in the first or second directions, and a second muxponder receives OTU2 signals in the second direction from the second network device, transmits through OTU2 signals in the first direction to the first network device, not transmitting drop signals in the first or second direction, a method of providing add/drop multiplexing for a SONET/SDH optical network comprising:

transmitting drop signals from the first muxponder to one or more client devices attached to the first muxponder;

receiving add signals at the first muxponder from the one or more client devices attached to the first muxponder; and receiving add signals at the second muxponder from the one or more client devices attached to the second muxponder.

7. The method of claim 6, wherein the first and second muxponders aggregate four OC-48/STM-16 signals to an OTU-2/DWDM ring.

8. The method of claim 7, wherein the first and second muxponders perform G.709 digital wrapping of the OC-48/STM signals.

9. The method of claim 6, wherein the add signals received by the second muxponder comprise the add signals received by the first muxponder.

10. The method of claim 9 wherein the second muxponder transmits drop signals to the one or more client devices attached to the second muxponder, the client devices being identical to the client devices attached to the first muxponder.

* * * * *